United States Patent Office 3,483,263
Patented Dec. 9, 1969

3,483,263
VAPOR PHASE CONDENSATION PROCESS
AND THE PRODUCTS THEREOF
Hans L. Schlichting, Grand Island, and Edward D. Weil,
Lewiston, N.Y., assignors to Hooker Chemical Corporation, Niagara Falls, N.Y., a corporation of New York
No Drawing. Original application June 1, 1961, Ser. No. 113,998. Divided and this application Feb. 23, 1967, Ser. No. 641,070
Int. Cl. C07c 33/10, 21/20
U.S. Cl. 260—633      2 Claims

ABSTRACT OF THE DISCLOSURE

A process for making halogenated dienes comprising reacting an alkanol of two three carbon atoms with tetrahaloethylene at an elevated temperature and then dehydrating the reaction product. Also, within the invention are included reactions to produce a mixture of pentadiene and pentenol by reacting propanol or isopropanol with tetrahaloethylene. Fluorobutenol and fluoropentenol are claimed as new compounds.

---

This is a division of our application S.N. 113,998, filed June 1, 1961 and now abandoned.

This invention describes new and useful halogenated unsaturated alcohol products useful as intermediates for preparing herbicides and insecticides and capable of being dehydrated to useful diene monomers, and processes for the production of these products.

More specifically, this invention relates to a vapor phase thermal condensation of alkylene substituted alcohols with a tetrahaloethylene to form halogenated unsaturated alcohols of the structure:

$$CX^1X^2=CX^3-A-OH$$

wherein $X^1$, $X^2$ and $X^3$ which may be the same or different, are halogens selected from the group consisting of bromine, chlorine and fluorine and A is an alkylene group having at least two carbon atoms. For reasons of yield, economy of operation and commercial availability of starting materials, the preferred compositions are those in which $X^1$, $X^2$ and $X^3$ are fluorine or chlorine and A has two or three carbon atoms.

Examples of the novel halogenated alcohol compositions which may be made by the inventive process, include but are not limited to the following representative compounds:

$CCl_2=CCl-CH(CH_3)OH$
$CCl_2=CCl-C(CH_3)_2OH$
$CCl=CCl-CH(C_2H_5)OH$
$CBr_2=CBr-CH(CH_3)OH$
$CF_2=CF-CH(CH_3)OH$
$CF_2=CF-C_3H_6-OH$
$CFCl=CF-CH(CH_3)CH$
$CFCl=CFC(CH_3)_2OH$
$CClF=CCl-CH(CH_3)OH$
$CClF=CCl-C(CH_3)_2OH$
$CBr_2=CCl-OH(CH_3)OH$ to name a few representative examples.

The above representative unsaturated alcoholic products may be made in good yield by the vapor phase thermal condensation at four hundred to seven hundred degrees centigrade, of a tetrahaloethylene with an alcohol. While the same alcohols have the trichlorovinyl group substituted on the alpha carbons are the primary products, lesser amounts of their dehydration and isomeric products are generally formed during the course of the reaction. The main reaction, which produces a hydrogen halide as a useful by-product, may be pictorially represented as follows:

$$CX^1X^2=CX^3X^4 + H-A-OH \xrightarrow{400-700° C.} CX^1X^2=CX^3-A-OH + HX^4$$

wherein $X^1$, $X^2$, $X^3$ which may be the same or different, are halogens selected from the group consisting of bromine, chlorine and fluorine and $X^4$ is a halogen selected from the group consisting of chlorine and bromine. In its process aspect, the preferred embodiments of the reactant is where $X^1$, $X^2$ and $X^3$ are chlorine or fluorine, $X^4$ is chlorine and A has two or three carbon atoms, this preference being for reasons of cost and availability of starting materials, and yield of products.

Suitable alcohol reactants are the alkyl and cycloalkyl alcohols. Preferred examples of the alcohol reactant are ethano, n-propanol and isopropanol. The higher alcohols such as butanol, the pentanols, hexanols, octanols, and cyclohexanol are less desirable because of the poorer yields obtained.

Suitable haloolefins for use in the process of the invention are tetrachloroethylene, chlorotrifluoroethylene, bromotrichloroethylene, dibromodichloroethylene, tribromochloroethylene, bromotrifluoroethylene, dibromodifluoroethylene, and tribromofluoroethylene, for example. For economic reasons, the first two are preferred.

The geometry and materials of construction of the reactor are not critical. Because their surface favors heat transfer, tubular designs allow the reactants to come more quickly to reaction temperatures, and also minimize the loss of efficiency caused by by-passing the outlet, thus being preferred. The reactor may, if desired, be preceded by a separate vaporizer and preheater of conventional design, or the region of the reactor near the input end may be utilized for vaporizing and preheating the reactants. The reactants may be fed either in admixture or from separate feed lines. Feeding may be done by gravity feed, mechanical pumps, or by carburation in a carrier gas.

Our process may be carried out in unpacked tubes or reaction chambers, the only requirement being that the material of construction must be resistant to hydrogen halide and halo-organic materials at the reaction temperature. Suitable materials are for example, nickel, various steels, graphite, ceramics, or glass.

The reaction temperature is four hundred to seven hundred degrees centigrade, preferably four hundred to six hundred and fifty degrees centigrade since above six hundred and fifty degrees centigrade, special materials of construction become necessary and below four hundred degrees centigrade, the rate is slow.

Where tetrachloroethylene is a reactant, an even narrower temperature range, four hundred to five hundred and fifty degrees centigrade is the preferred temperature range when a molar excess of tetrachloroethylene relative to alcohol is used. The reason for using this preferred combination of temperature (four hundred to five hundred and fifty degrees centigrade), and ratio of reactants (a molar excess of tetrachloroethylene to alcohol), is that outstandingly high yields of product are obtained as compared to the broader conditions applicable to the process as a whole. For example, when a high ratio of tetrachloroethylene to ethanol is used, i.e., ten moles of tetrachloroethylene to one mole of ethanol, ninety percent or more of the tetrachloroethylene is converted to 1,1,2-trichloro-1-butene-2-ol, whereas when an excess of ethanol is used, it is difficult to exceed a forty percent yield based on tetrachloroethylene converted and the reactor and product contain a large amount of tarry and carbonaceous material. Another substantial advantage of using the preferred conditions of temperature and ratio of reactants (where tetrachloroethylene is a reactant), is that good yields of product can be obtained using substantially lower temperatures than when equimolar amounts of the reactants or where an excess of alcohol is used. Obviously, lower operating temperatures are more economical per se, but when coupled with the attendant factors of better yields of product and less tarry and carbonaceous contaminants, they represent a major advantage over the generally higher ranges used in the processes of the related prior art.

Retention times of a fraction of a second up to several minutes may be used, but one to sixty seconds is a preferred range.

The reaction vessel or tube may, as stated, be unpacked, but to facilitate heat transfer a packing may be used if desired. Inert gas diluents, such as nitrogen, may also be used.

Pressure is conveniently atmospheric or close to atmospheric although the process is workable at sub- or super-atmospheric pressures also. While, as stated above, no catalyst is required, it is possible to employ a catalyst such as a surface active solid, noble metal, metal halide, free-radical catalyst or others.

The process of our invention is surprising in that no serious loss of product results from self-condensation of either reactant. Some further reaction of the product, however, with either of the two reactants may occur, especially toward the outlet end of the reactor, and for this reason, it has been found preferable to operate the process at low levels of conversion (a few percent up to seventy-five percent, preferably), and to separate the unreacted starting materials from the product. These unreacted starting materials may then be recycled to the reactor. The separation and recycling may be performed batchwise or continuously. It is convenient to condense the entire effluent from the reactor, except for the hydrogen chloride by passing the effluent through a condenser cooled below the boiling point of the lower boiling reactant, then to fractionally distill the condensate in a continuous or batch still to separate the unreacted starting materials from the product. Alternatively, the effluent from the reactor may be fed directly to a partial condenser or stripping column wherein the separation of the product (which is always higher boiling), from the unreacted starting material is performed. The latter, being uncondensed as they leave such a partial condenser or stripping column may be separated from the hydrogen chloride by a second partial condenser, stripping column, or scrubbing column, and the unreacted starting materials then recycled.

This invention in its process aspects offers several advantages over the prior art. Among them is the one-step production of alcohols containing the valuable and reactive trihalovinyl group. While trihalovinyl compounds such as 2,3,3-trichloroallyl alcohol have been prepared before, the preparation was tedious and expensive since it involved a multi-step synthesis suitable only for laboratory scale synthesis. Similarly, the routes to preparing higher trihalovinyl alcohols have been lacking, such compounds being especially desirable since they can be used as precursors for preparing a variety of elastomers, films and resins. The novel process of this invention not only involves a one-step preparation, but it uses inexpensive starting materials or reactants, requires no catalyst, is easily adaptable to a continuous commercial process and yields the valuable hydrogen halide as useful byproduct.

An additional advantage of this process is that it makes available the aforementioned alcohols having the reactive trihalovinyl moiety, which may be reacted with various substances to prepare useful products. For example, when these alcohols are reacted with phenyl isocyanate in a one-step reaction, they form phenylurethanes which have good herbicidal properties. The herbicidal activity of a phenylurethane derivative is quite surprising in view of the inactivity of the phenylurethane of the known $$CCl_2=CCl—CH_2OH$$

In addition, these trihalovinyl alcohols can be reacted with O,O-dialkyl phosphoryl and thiophosphoryl halides to form insecticidal compositions. These novel compositions, besides being a fertile organic intermediate for preparing pesticides, offer the further advantage of being capable of dehydration to dienes containing the reactive trihalovinyl structure.

The above diene products are valuable as organic intermediates but are principally of interest as precursors for preparing stable non-inflammable resins, films, elastomers, and the like. The dehydration itself is readily accomplished by any number of procedures analogous to the known alcohol dehydration reactions, such as for example, passing the alcohol over a solid dehydration catalyst such as alumina, clay, silica gel, calcium sulfate, calcium phosphate or equivalent materials. The dehydration may be done continuously in a two-stage process, the novel thermal condensation constituting the first step, then passing the reactor effluent (preferably freed from hydrogen halide and unreacted starting materials), continuously to the dehydration reactor. Considerable economy can be effected by using the heat content of the hot gases from the thermal condensation to supply heat for the endothermic dehydration step, by use of heat exchangers. An example of the value of the vapor phase thermal condensation and dehydration step may be seen as follows: a reaction product of the novel condensation, $Cl_2C=CClCH(OH)CH_3$ purified or not, is dehydrated to 1,1,2-trichloro-1,3-butadiene ($Cl_2C=CCl—CH=CH_2$). This butadiene is a valuable known monomer capable of polymerization to fire-retardant thermoplastic resins and elastomers, and has been previously available in poor yield through a costly, commercially impractical multi-step synthesis. By analogous dehydration of the alcohols from tetrachloroethylene and isopropanol or tetrachloroethylene and n-propanol, the valuable new monomers and chemical intermediates 3,4,4-trichloroisoprene ($Cl_2C=CClC(CH_3)=CH_2$) and 1,1,2-tricholro-1,3-pentadiene ($ClC_2=CClCH=CHCH_3$) may be made. By analogous dehydration of the other new halogenated alcohol products of our process, substituted butadienes, hitherto inaccessible, may be made. For example, dehydration of the 1,1,2-trifluoro-1-butene-3-ol, which is produced from $CF_2=CFCl$ and ethanol, yields the known useful monomer $CF_2=CF—CH=CH_2$ and dehydration of 1,1,2-trifluoro-3-methyl-1-butene-3-ol, which is produced from $CF_2=CFCl$ and isopropanol, yields the hitherto inaccessible monomer $CF_2=CF—C(CH_3)=CH_2$ which can be polymerized to elastomers and thermoplastics having advantageous chemical and thermal stability.

In its composition aspects the products of this invention are valuable as organic and polymer intermediates. In addition, various products of this invention have been found to be both novel and useful. For example, where ethanol is a reactant, a small amount of dehydrogenation to acetaldehyde occurs. Part of the acetaldehyde undergoes breakdown to methane and carbon monoxide, which are vented from the recovery system, being either disposed of or burnt for their thermal value. Part of the acetaldehyde leaves the reactor undecomposed. It may be separated from the main product by distilaltion, extraction with water, extraction with bisulfite solution, or other means. If not removed, a part of the acetaldehyde may react with the alcohol product to produce an acetal of the structure $$(CX^1X^2=CX^3—A—O—)_2CHCH_3$$

Under most conditions of operating our process with ethanol as a reactant, these acetals are obtained as byproducts. The acetals may be easily regenerated to the alcohols plus acetaldehyde by treatment with aqueous acid. The acetals may also be isolated and have been found to have utility as pesticides, insecticides, synergists and intermediates for pesticides. The acetals may, of course, be made as major products in a separate step by deliberately introducing acetaldehyde into the alcohols of the invention.

Also produced as by-products of the invention are diols of the structure HO—A—CX¹=CX²—A—OH. The quantity produced under the preferred conditions of the present invention is very small, generally less than ten percent of the product, but can be increased by higher retention times, an excess of the H—A—OH reactant, and recycling of the CX¹X²=CX³—A—OH product. These diols are of utility for preparation of polyesters and triene monomers. For example, HOCH(CH₃)CCl=CClCH(CH₃)OH can be dehydrated to CH₂=CH—CCl=CCl—CH=CH₂ which is useful for introducing cross-links into polymers.

To further make clear the process of the invention and to describe certain of the products available thereby, the following non-limiting examples are given.

EXAMPLE 1

Into an unpacked cylindrical Pyrex tube heated at five hundred and thirty degrees is passed a mixture of ethanol and tetrachloroethylene in the molar ratio of 2:1. The reactants are fed as liquids and evaporated just within the inlet part of the tube, this section of the tube thus serving as an evaporator-preheater zone. The flow rate is adjusted to cause a retention time in the five hundred and thirty degree zone of six to ten seconds, calculated by the equation:

(retention time in seconds)
$$= \frac{\text{Volume of reactor in liters} \times 273}{\text{Moles per second} \times 22.4\ (273 + T^\circ\ C.)}$$

where T is operating temperature of a reactor (in this case, five hundred and thirty degrees centigrade). The effluent gases are conducted through a water-cooled condenser. From eight thousand parts of tetrachloroethylene and forty-four hundred parts of ethanol was obtained five hunderd and ninety parts of hydrogen chloride, part of which dissolved in the condensate, and part of which left the condenser as gas. Some methane, carbon monoxide, and ethylene also passed through uncondensed and were identified by infrared spectroscopy. The condensed organic product, after stripping off the unreacted ethanol and tetrachloroethylene (which were recycled in a subsequent operating period), there remained two thousand, nine hundred and sixty-two parts of crude organic product.

This crude product on distillation through a fractionating column, was found to contain about eighty-seven percent of a compound established to be 1,1,2-trichloro-1-butene-3-ol, boiling point eighty-five degres (twelve mm.), six percent of an acetal CCl₂=CCl—CH(CH₃)O₂CHCH₃ boiling point one hundred and fifty-nine to one hundred and sixty degrees (eighteen mm.), and an undistillable residue from which a compound, melting point one hundred and seventy-four to one hundred and seventy-five degrees, and identified as CH₃CH(OH)CCl=CClCH(OH)CH₃ was isolated by extraction with hot benzene.

The characterization of these new compounds was done as follows:

(a) 1,1,2-trichloro-1-butene-3-ol
Boiling point, eighty-five degrees centigrade (twelve mm.); $D_4^{25}$ 1.4384; $N_D^{25}$ 1.5098.

*Analysis.*—Calcd. for $C_4H_5OCl_3$: 60.7 percent. Found: Cl, 60.3 percent.

The compound was shown to be an alcohol by reaction with acetyl chloride to give an acetate of boiling point ninety-five to ninety-eight degrees (twelve mm.), having the correct infrared spectrum for an ester. The secondary alcohol structure was shown by infrared absorption bands characteristic of methyl groups.

The alcohol upon admixture with phenyl isocyanate in the presence of about one percent N-methylmorpholine as catalyst at eighty to ninety-five degrees formed a solid phenylurethane, melting point, 96.5 to 97.5 degrees (from heptane).

*Analysis.*—Calcd. for $C_{11}H_{10}O_2NCl_3$: Cl, 36.2 percent; N, 4.75 percent. Found: Cl, 35.8 percent; N, 4.70 percent.

(b) The acetal: CCl₂=CCl—CH(CH₃)O₂CHCH₃
Boiling point, one hundred and fifty-nine to one hundred and sixty degrees centigrade (eighteen mm.); $D_4^{25}$ 1.3850; $N_D^{25}$ 1.5072.

*Analysis.*—Calcd. for $C_{10}H_{12}O_2Cl_6$: Cl, 56.5 percent. Found: Cl, 56.4 percent.

The structure was proved by warming at ninety to one hundred degrees with five percent aqueous H₂SO₄. The acetaldehyde which distilled off was trapped in a 2-N hydrogen chloride solution of 2,4-dinitrophenylhydrazine, precipitating the known acetaldehyde 2,4-dinitrophenylhydrazone. The orgxanic layer was separated from the H₂SO₄ and found to be identical in infrared spectrum to CCl₂=CClCH(CH₃)OH as prepared above.

(c) 3,4-dichloro-3-hexene-2,5-diol
Melting point, one hundred and seventy-four to one hundred and seventy-five degrees (from benzene).

*Analysis.*—Calcd. for $C_6H_{10}O_2Cl_2$: Cl, 38.4 percent. Found: Cl, 38.7 percent.

The indicated structure was proved by infrared spectral examination, which showed the expected exclusion of the double bond stretching vibration due to the molecular center of symmetry, and which showed a double bond in the region characteristic of —OH vibrations.

EXAMPLE 2

A run was made in the manner of the foregoing example, except that tetrachloroethylene and ethanol were fed in 2:1 mole ratio. Similar results were obtained except only three percent of the organic condensate consisted of the acetal, the remainder being the 1,1,2-trichloro-1-buten-3-ol.

EXAMPLE 3

Into a cylindrical Pyrex tube heated at five hundred and sixty degrees was fed a 5:1 (molar ratio), mixture of tetrachloroethylene and isopropanol, at a rate such as to establish a retention time of 6.4 seconds in the heated reactor. In all, fifty-six hundred parts of tetrachloroethylene and four hundred and ten parts of isopropanol were fed. After stripping unreacted starting material and about one hundred and sixty parts of acetone (formed by dehydrogenation of the isopropanol), there was obtained as product a compound having the correct analysis for CCl₂=CClC₃H₆OH, boiling point, ninety to ninety-five degrees (eleven mm.), $D_4^{24}$ 1.3832, $N_D^{25}$ 1.5069. The infrared spectrum shows bands indicative of a tertiary alcohol structure, so that the product is evidently 1,1,2-trichloro-3-methyl-1-buten-3-ol.

*Analysis.*—Calcd. for $C_5H_7OCl_3$: Cl, 55.6 percent. Found: Cl, 55.7 percent.

Careful fractionation of the crude recovered tetrachloroethylene revealed the presence of a fraction boiling at thirty-eight degrees (eleven mm.), which was found by infrared to be identical to 3,3,4-trichloroisoprene as prepared and described in Example 6 below.

EXAMPLE 4

In the manner of the foregoing example, two thousand, three hundred and twenty parts of tetrachloroethylene and one hundred and sixty-eight parts of n-propanol are reacted at five hundred and seventy degrees to obtain a product having the correct analysis for $$CCl_2=CCl-C_3H_6OH$$

boiling point, one hundred and fifteen to one hundred and twenty degrees (eleven mm.), $D_4^{25}$ 1.3943, $N_D^{25}$ 1.5088. This product was found by infrared analysis to be isomeric with the one prepared from isopropanol.

*Analysis.*—Calcd. for $C_5H_7OCl_3$: Cl, 55.6 percent. Found: Cl, 55.3 percent.

EXAMPLE 5

1,1,2-trichloro-1-buten-3-ol was dehydrated to 1,1,2-trichlorobutadiene as follows:

The dehydration unit consisted of a vertically mounted tubular electric furnace which was thermostatically controlled. The reaction chamber was a three-quarter inch Pyrex tube, forty inches in length, packed with activated alumina (eight to fourteen mesh). The tube was fitted with a male standard taper joint at the bottom leading to a three-necked flask as a receiver fitted with a water-cooled reflux condenser followed by a wash-bottle as hydrogen chloride absorber.

Ten hundred and two grams of 1,1,2-trichloro-1-buten-3-ol as made in the description above was passed through the pyrolysis unit at two hundred and seventy to two hundred and eighty degrees centigrade. The feeding velocity was about one hundred and twenty milliliters per hour. Nitrogen was blown through the system as a carrier gas (6 l./hour). The effluent was washed with five percent aqueous sulfuric acid, dried over calcium sulfate, and fractionally distilled to obtain seven hundred and thirty grams of 1,1,2-trichlorobutadiene, boiling point, sixty degrees centigrade, forty-five millimeters, $D^{25°\ C.}$ 1.3710, $N_D^{25°\ C.}$ 1.5327, and identical with the known compound of this structure.

EXAMPLE 6

1,1,2-trichloro-3-methyl-1-buten-3-ol was dehydrated by passage over activated alumina as in Example 5. From one hundred and sixty parts of the alcohol was obtained one hundred and five parts of 3,4,4-trichloroisoprene, boiling point thirty-eight degrees (eleven mm.), $D^{25°C.}$ 1.2893, $N_D^{25°C.}$ 1.4982. The infrared spectrum indicates the presence of $=CH_2$ and $—CH_3$ groups.

*Analysis.*—Calcd. for $C_5H_5Cl_3$: Cl, 62.1 percent. Found: Cl, 61.7 percent.

EXAMPLE 7

The product $CCl_2=CCl-C_3H_6OH$ from n-propanol and tetrachloroethylene as described above was passed over activated alumina at two hundred and eighty to two hundred and ninety degrees as in Example 5. From fifty parts of the alcohol was obtained twenty-five parts of 1,1,2-trichloro-1,3-pentadiene, boiling point fifty-one degrees (twelve mm.), $D_4^{25}$ 1.3352, $N_D^{25}$ 1.5260. The infrared spectrum shows the presence of $—CH_3$, conjugated double bonds and no terminal $=CH_2$.

*Analysis.*—Calcd. for $C_5H_5Cl_3$: Cl, 62.1 percent. Found: Cl, 59.4 percent.

EXAMPLE 8

In a stainless steel tube heated at six hundred to six hundred and ten degrees centigrade is fed gaseous chlorotrifluoroethylene at the rate of 2.5 moles of gas per liter of reactor volume per hour and ethanol at a rate of three moles of liquid per liter of reactor volume per hour. The reactor effluent was passed through a water cooled condenser. The condensed product was fractionated to isolate the desired 1,1,2-trifluoro-1-buten-3-ol, a colorless liquid boiling point forty to forty-five degrees (one hundred mm.), $N_D^{25}$ 1.3984. The identity of the product was established by examination of the infrared spectrum which revealed absorption bands characteristic of a —OH group, a $CF_2=CF—$ group, and a methyl group. The structure was further confirmed by dehydration (by passage over alumina), to obtain the known $$CF_2=CF-CH=CH_2$$

boiling point three degrees centigrade.

EXAMPLE 9

The process of the preceding example was carried out using ispropanol in place of ethanol. The principal product besides hydrogen chloride was 1,1,2-trifluoro-3-methyl-1-buten-3-ol, a colorless liquid, boiling point forty-five to fifty degrees centigrade (seventy mm.). The infrared spectrum of this product showed the characteristic absorption of —OH, $CF_2=CF—$, and —$CH_3$ groups.

Passage of this alcohol over a bed of granular alumina at two hundred to two hundred and fifty degrees yielded water plus 3,4,4-trifluoroisoprene, a colorless liquid of boiling point thirty-five to forty degrees centigrade. The infrared spectrum of this compound showed the characteristic absorption of $CF_2=CF—$, $CH_2=$, and $CH_3—$ functional group, the double bond absorption being characteristic of a conjugated diene.

Infrared examination of the crude condensed product from the isopropanol/$CF_2=CFCl$ reaction before fractionation showed the presence of this same diene.

EXAMPLE 10

In a similar manner to that described in Example 1, $CCl_2=CCl-C(CH_3)_2OH$ and the known $$CCl_2=CCl-CH_2OH$$

were converted to the corresponding phenylurethanes. The structures and properties are as follows:

$CCl_2=CCl-CH(CH_3)OCONHC_6H_5$:
  colorless solid, M.P., 96.5–97.5° C.
$CCl_2=CCl-C(CH_3)_2OCONHC_6H_5$:
  colorless solid, M.P., 106–108° C.
$CCl_2=CCl-CH_2OCONHC_6H_5$:
  colorless solid, M.P., 83–84° C.

These compounds were applied at the rate of sixteen pounds per acre to soil infested with foxtail and crabgrass, prior to the emergence of these weeds. The first two compounds in the above table gave substantially complete repression of the emergence of these weeds, while the last named compound was not active.

EXAMPLE 11

One mole of O-O-diethyl thiophosphoryl chloride, one mol of triethylamine, and one mole of 1,1,2-trichloro-1-buten-3-ol were mixed in one liter of dry benzene and refluxed until no further precipitation of triethylamine hydrochloride occurred. The solution was filtered and the solvent evaporated. The residual liquid was distilled through a short-path still. The product, O,O-diethyl O-(1,1,2-trichloro-1-buten-3-yl) phosphorothionate was a yellowish liquid having the correct phosphorous and chlorine analysis and infrared absorption bands indicative of the carbon-to-carbon double bonds, the —P=S group, and C—O—C linkages.

In a similar fashion, 1,1,2-trichloro-3-methyl-1-buten-3-ol was converted to O,O-diethyl O-(1,1,2-trichloro-3-methyl-1-buten-3-yl) phosphorothionate. By use of O,O-dimethyl thiophosphoryl chloride in place of O,O-diethyl thiophosphoryl chloride, the O,O-dimethyl homologs of the above phosphorothionates were prepared. By use of O,O-dimethyl phosphoryl chloride and O,O-diethyl phosphoryl chloride the phosphate analogs of the above compounds were prepared similarly. The boiling points and analyses are as follows:

| Compound | Boiling Point | Chlorine Analyses | |
|---|---|---|---|
| | | Calcd. | Found |
| $(CH_3O)_2PS-OCH(CH_3)CCl=CCl_2$ | 50-2° (0.05 mm.) | 35.6 | 35.2 |
| $(C_2H_5O)_2PS-OCH(CH_3)CCl=CCl_2$ | 85-87° (0.1 mm.) | 32.5 | 32.2 |
| $(CH_3O)_2PS-O-C(CH_3)_2CCl=CCl_2$ | 55-59° (0.05 mm) | 34.0 | 33.6 |
| $(C_2H_5O)_2PS-OC(CH_3)_2CCl=CCl_2$ | 75-80° (0.05 mm) | 31.2 | 31.2 |
| $(CH_3O)_3PC-OCH(CH_3)CCl=CCl_2$ | 40-3° (0.01 mm) | 37.6 | 37.1 |
| $(C_2H_5O)_3PO-OCH(CH_3)CCl=CCl_2$ | 65-68° (0.02 mm) | 34.2 | 34.4 |
| $(CH_3O)_3PO-O-C(CH_3)_2CCl=CCl_2$ | 43-46° (0.02 mm) | 35.8 | 35.2 |
| $(C_2H_5O)_3PO-O-C(CH_3)_2CCl=CCl_2$ | 61-64° (0.015 mm) | 32.7 | 32.6 |

These compounds were yellowish liquids, of pungent odor, soluble in alcohols, acetone and benzene. Each of these compounds when sprayed onto houseflies at one percent concentration in an aqueous dispersion gave substantially one hundred percent knockdown and one hundred percent kill in twenty-four hours.

We claim:
1. $CF_2=CF-CH(CH_3)OH$.
2. $CF_2=CF-C(CH_3)_2OH$.

References Cited

UNITED STATES PATENTS

| | | | |
|---|---|---|---|
| 2,561,516 | 7/1951 | Ladd et al. | 260—633 XR |
| 2,594,184 | 4/1952 | Ladd | 260—633 XR |
| 2,873,297 | 2/1959 | Ramsden | 260—633 XR |
| 2,942,031 | 6/1960 | Kundiger | 260—633 XR |
| 2,490,753 | 12/1949 | Hill et al. | 260—653.3 |
| 2,750,431 | 6/1956 | Tarrant et al. | 260—653.3 XR |
| 2,915,508 | 12/1959 | Bolstad et al. | 260—87.5 |
| 2,962,484 | 11/1960 | Honn | 260—87.5 |
| 3,116,269 | 12/1963 | Honn | 260—653.3 |

OTHER REFERENCES

McBee et al., Jour. Am. Chem. Soc., vol. 76, pp. 3725–3728, 1954.

Lovelace et al., Aliphatic Fluorine Compounds, Reinhold Publishing Corp., p. 106 (1958).

Fieser et al., Org. Chem., pp. 54–58 (1944), D. C. Heath Co., Boston.

Nikishin I, Akad. Sci. U.S.S.R., Div. of Chemical Sciences, #6, 1959, pp. 1098–1100.

Nikishin II, Akad. Nauk U.S.S.R., Otden Khim., 1959, No. 6, pp. 1134–1135, and Abstract.

ACS, Aleotropic Data (1952), p. 28.

Activated Alumina, Aluminum Ore Company, 1938, pp. 4, 14.

BERNARD HELFIN, Primary Examiner

H. T. MARS, Assistant Examiner

U.S. Cl. X.R.

71—111; 260—601, 603, 615, 653.3, 77.5, 955, 966, 973, 994; 424—221

PO-1050
(5/69)

UNITED STATES PATENT OFFICE
CERTIFICATE OF CORRECTION

Patent No. 3,483,263      Dated December 9, 1969

Inventor(s) Hans L. Schlichting and Edward D. Weil

It is certified that error appears in the above-identified patent and that said Letters Patent are hereby corrected as shown below:

Column 6, line 27, delete "orgxanic" and insert --- organic ---;

Column 6, line 40, delete "double" and insert --- doubled ---;

Column 8, line 64, delete "phosphorous" and insert --- phosphorus ---

Column 9, line 5 in Table, delete "$_2$PC" and insert --- $_2$PO ---.

SIGNED AND
SEALED
AUG 18 1970

(SEAL)
Attest:

Edward M. Fletcher, Jr.
Attesting Officer

WILLIAM E. SCHUYLER, JR.
Commissioner of Patents